United States Patent [19]

Alderton

[11] 4,295,770
[45] Oct. 20, 1981

[54] HOOKBOLT ADAPTER

[75] Inventor: Gordon H. S. Alderton, Bingley, England

[73] Assignee: Henry Lindsay Limited, Shipley, England

[21] Appl. No.: 83,831

[22] Filed: Oct. 11, 1979

[30] Foreign Application Priority Data

Oct. 16, 1978 [GB] United Kingdom ............... 40653/78

[51] Int. Cl.³ .......................................... F16B 43/02
[52] U.S. Cl. ..................................... 411/531; 238/343
[58] Field of Search .................. 85/50 R, 50 C, 9 R, 85/29; 238/343, 351, 338, 355, 357, 315, 310, 378, 377; 151/44, 35, 37; 411/531, 533

[56] References Cited

U.S. PATENT DOCUMENTS

| | | | |
|---|---|---|---|
| 260,848 | 7/1882 | Curran | 151/63 |
| 1,102,068 | 6/1914 | Nagel | 85/50 R X |
| 1,230,703 | 6/1917 | Gregg et al. | 238/351 |
| 1,571,008 | 1/1926 | Hilpert | 238/343 X |

FOREIGN PATENT DOCUMENTS

| | | | |
|---|---|---|---|
| 411400 | 6/1934 | United Kingdom | 85/50 R |
| 491209 | 8/1938 | United Kingdom | 85/50 R |

Primary Examiner—Ramon S. Britts
Attorney, Agent, or Firm—Browdy and Neimark

[57] ABSTRACT

A hookbolt adapter for use with a bolt in order to convert the latter into a hookbolt, the adapter comprising a hole through which the shank of the bolt can be taken, a nose portion and a tail portion diametrically opposed to each other with respect to the hole, and a support surface to be engaged by the head or by the nut of the bolt. The hole is of circular cross-section and the axis of the hole is slightly inclined to a line perpendicular to the support surface, and two diametrically opposed substantially semicircular contact portions of the wall of the hole serve to retain the bolt rigid with the adapter when the axis of the bolt adopts a position substantially perpendicular to the support surface.

8 Claims, 7 Drawing Figures

HOOKBOLT ADAPTER

This invention relates to an adapter for use with a bolt in order to convert the latter into a hookbolt.

Hookbolts are particularly useful in the construction industry, since they enable components to be attached to structural members such as I-beams without the necessity to drill mounting holes in the beams. Thus, the "hook" part of the bolt can engage over the edge of a flange and, with the component attached to the bolt, the assembly of the component with the beam can readily be achieved on site. When hookbolts are cast in one piece, substantial cost is incurred in providing hookbolts in a range of sizes. Accordingly, it has been proposed to provide "adapters" which enable standard bolts to be converted into hookbolts. The adapters only form the "hook" of the hookbolt and evidently can enable a range of hookbolt sizes to be provided much more cheaply than is possible when one-piece hookbolts are provided. The known adapter has a hole through which a shank of the bolt is taken, and a nose portion and a tail portion substantially diametrically opposed with respect to the hole. The nose portion forms the "hook", whereas the tail portion engages and gives support to the shank of the bolt.

The present invention has been developed with a view to providing improved operating performance for a hookbolt adapter.

According to the invention there is provided an adapter for use with a bolt in order to convert the latter into a hook bolt, said adapter comprising a hole through which the shank of the bolt can be taken, a nose portion and a tail portion diametrically opposed to each other with respect to the hole, and a support surface to be engaged by the head or by the nut of a bolt, in which said hole is of circular cross-section and the axis of said hole is slightly inclined to a line perpendicular to said support surface, and in which two diametrically opposed substantially semi-circular contact portions of the wall of said hole serve to retain the bolt rigid with the adapter when the axis of the bolt adopts a position substantially perpendicular to said support surface.

Preferably, the tail portion has a substantially semi-circular contact surface for engagement with the shank of the bolt in order to minimise stress concentration in the bolt.

In order to minimise stress concentration in the nose portion, preferably the nose portion is constructed in the manner of a crane hook.

In order to render the head, or the nut when desired, of the bolt captive, an upstanding wall may be provided on the adapter and having a slot in which can be accommodated an apex of the head or nut.

The invention will now be described in more detail, by way of example only, with reference to the accompanying drawings, in which.

Figure 1:
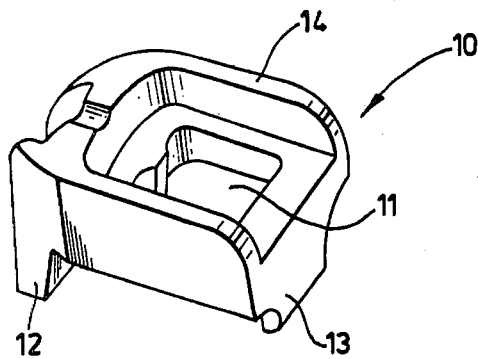
FIG. 1 is a perspective view of a known construction of adapter for converting a bolt into a hook bolt.
Figure 2:
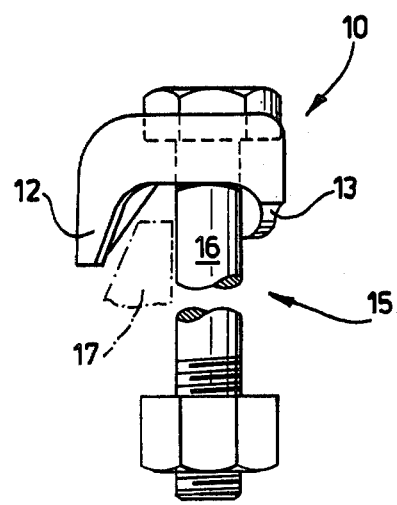
FIG. 2 is a side view of the adapter of FIG. 1 in assembly with a standard bolt.
Figure 3:
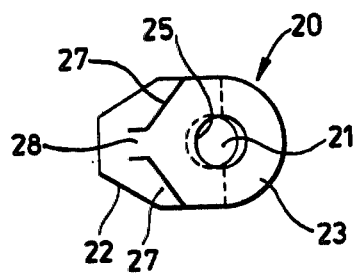
FIG. 3 is a plan view of an embodiment of adapter according to the invention.
Figure 4:
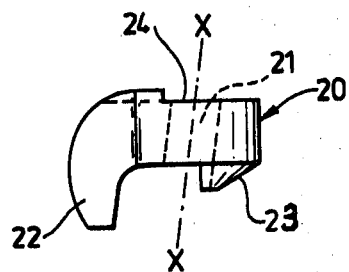
FIG. 4 is a side view of the embodiment of the invention.
Figure 5:
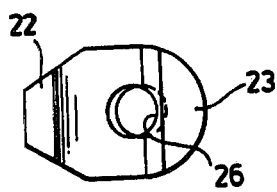
FIG. 5 is an under plan view.
Figure 6:
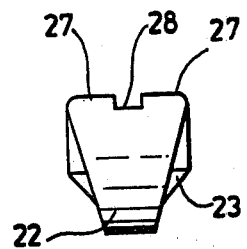
FIG. 6 is a view from one end.
Figure 7:
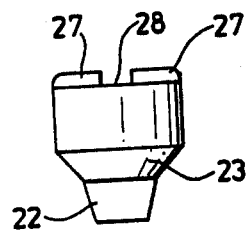
FIG. 7 is a view from the opposite end.

Referring now to FIGS. 1 and 2 of the drawings, the known adapter is designated generally by reference numeral 10 and is provided with a through-hole 11 of square cross-section, and a nose portion 12 and a tail portion 13 which are substantially diametrically opposed to each other, with respect to the hole 11.

An upstanding wall 14 of the adapter 10 defines a generally rectangular recess in which the head of a bolt can be accommodated, the shank of the bolt being taken through the hole 11. The assembly of the adapter with a standard bolt, designated generally 15, is illustrated in FIG. 2.

As shown in FIG. 2, the tail portion 13 engages the shank 16 of the bolt 15 and, having regard to FIG. 1, this contact with the shank 16 will be a line contact. The nose portion 12 converts the bolt 15 into a hookbolt, in that the nose portion 12 can engage over the edge of a flange, such as the flange 17 illustrated in dotted lines in FIG. 2.

Referring now to FIGS. 3 to 7 of the drawings, an embodiment of adapter according to the invention is illustrated and, while a bolt is not shown in FIGS. 3 to 7, it should be understood that any standard bolt may be assembled with the adapter of FIGS. 3 to 7 in generally similar manner to that illustrated and described above with reference to FIGS. 1 and 2. The adapter shown in FIGS. 3 to 7 is designated generally by reference numeral 20 and comprises a through-hole 21 of generally circular cross-section, a nose portion 22 and a tail portion 23 which are diametrically opposed to each other with respect to hole 21. The nose portion 22 is contoured in the manner of a crane hook so as to provide optimum stress characteristics under load, and is capable of engaging firmly over the edge of a flange or the like to which the adapter is to be "hooked". The tail portion 23 provides a substantially semi-circular contact surface for engagement with the shank of a bolt in order to provide rigid support therefor.

The hole 21 has a circular cross-section so as to provide a lesser concentration of stress on the shank of a bolt, as compared with the known construction. In addition, as will be seen from FIGS. 3, 4 and 5, the longitudinal axis XX of the hole 21 is slightly inclined to a line perpendicular to the upper surface 24 of the adapter. Thus, the shank of a bolt can readily be received by the hole 21, but upon assembly the shank will tend to move to a position in which the axis of the shank of the bolt is substantially perpendicular to the surface 24, in which case two diametrically opposed critical contact regions of the wall of the hole 21 will engage with the shank of the bolt so as to provide a very rigid assembly which is capable of operating with almost the same degree of rigidity as would be provided by a hook bolt of integral construction. The critical contact regions in the wall defining the hole 21 comprise a substantially semicircular portion 25 at the upper end of the hole 21, and a substantially semi-circular portion 26 at the lower end of the hole 21. The adapter 20 is preferably cast in malleable iron, so that the contact regions 25 and 26 are able to deform slightly under load when engaged by the shank of the bolt, so that the shank can take up the proper position and at the same time form a rigid assembly with the adapter 20.

In order to render the head of a bolt captive, the adapter 20 is provided with an upstanding wall 27, which has a slot 28 defined therein, the slot 28 accommodating one of the apices of the head of the bolt. If it is desired to allow the head of the bolt to be rotated, or if the adapter is intended to be located at the "nut" end of the bolt, then the adapter 20 may be modified by the exclusion of the upstanding wall 27 and slot 28, so that the surface 24 extends continuously across the top surface of the adapter 20. Apart from the removal of the wall 27 and slot 28, the adapter will be identical in construction. Thus, a pair of adapters can be provided having substantially similar stress characteristics, the only substantial difference being that one type is intended for use at the bolthead end of the bolt, whereas the other type is intended to be used at the nut end of the bolt.

Therefore, in accordance with the location of the adapter at the "head" end or at the "nut" end of the bolt, the support surface 24 will be engaged directly (or indirectly through e.g. a washer) by the bolthead or by the nut, and in use the shank of the bolt will move to adopt a position in which the axis of the bolt is substantially perpendicular to the support surface 24, whereby the critical contact portions 25 and 26 can engage the shank of the bolt so as to form a very rigid assembly of the adapter 20 with the bolt.

I claim:

1. A hookbolt adapter for use with a bolt in order to convert the latter into a hookbolt, the hookbolt comprising:
    a member having therein a hole of circular cross-section through which a shank of a bolt can be taken, said hole having an entrance thereto and a wall;
    a nose portion and a tail portion of said member diametrically opposed to one another with respect to said hole;
    a support surface of said member surrounding said entrance to said hole to be engaged by a head or by a nut of a bolt, said hole having an axis which is slightly inclined to a line perpendicular to said support surface; and
    two diametrically opposed substantially semi-circular contact portions of said member provided on said wall of said hole and each associated with a respective one of said nose portion and said tail portion, said contact portions being made of malleable material so as to allow a bolt to take-up a position in which the axis of such a bolt will extend substantially perpendicular to said support surface and such a bolt will be held rigidly with the hookbolt adapter by said contact portions.

2. An adapter according to claim 1, in which said tail portion has a substantially semi-circular contact surface to engage a shank of a bolt.

3. An adapter according to claim 1, in which said nose portion is constructed in the manner of a crane hook.

4. An adapter according to claim 1, including an upstanding wall provided on the adapter and having the slot to accommodate an apex of the bolt head or nut in order to render the latter captive.

5. An adapter according to claim 1, in which one of said semi-circular contact portions is located adjacent one end of said hole, and the other of said semi-circular contact portions is located adjacent to the opposite end of said hole.

6. An adapter according to claim 1 or 2, in combination with a bolt extending through said hole.

7. An adapter according to claim 3 or 4 in combination with a bolt extending through said hole.

8. An adapter according to claim 5, in combination with a bolt extending through said hole.

* * * * *